United States Patent [19]

Thompson

[11] 4,431,536

[45] Feb. 14, 1984

[54] SKIMMER FOR FLOATING ROOF STORAGE TANKS

[75] Inventor: Timothy J. Thompson, Detroit, Mich.

[73] Assignee: Marathon Oil Company, Findlay, Ohio

[21] Appl. No.: 449,951

[22] Filed: Dec. 15, 1982

[51] Int. Cl.$^3$ .............................................. B03B 5/28
[52] U.S. Cl. ................................. 210/123; 210/242.3; 220/219
[58] Field of Search ...................... 210/121, 123, 242.3, 210/923, 540, 115, 114, 112, 416.5, DIG. 9; 220/216, 219

[56] References Cited

U.S. PATENT DOCUMENTS

| | | | |
|---|---|---|---|
| 2,307,498 | 1/1943 | Fleming | 210/115 |
| 2,913,138 | 11/1959 | Swick | 220/219 |
| 3,745,115 | 7/1973 | Olsen | 210/923 |
| 3,836,000 | 9/1974 | Jakubek | 210/115 |
| 4,111,806 | 9/1978 | Wright et al. | 210/115 |
| 4,132,645 | 1/1979 | Bottomley et al. | 210/104 |
| 4,147,629 | 4/1979 | Geurtsen | 210/104 |

*Primary Examiner*—Charles N. Hart
*Assistant Examiner*—Sharon T. Cohen
*Attorney, Agent, or Firm*—Jack L. Hummel; Rodney F. Brown

[57] ABSTRACT

The invention provides for a hydrocarbon skimmer (10) interconnected to the floating roof (30) of a floating roof storage tank (300) wherein a liquid mixture of sour water (40) and hydrocarbons (50) are stored. The hydrocarbon skimmer (10) of the present invention is placed in a formed cavity (100) located on the underside (20) of the floating roof (30) wherein the cavity (100) extends above the surface of the floating roof (30) and is capable of collecting the hydrocarbons (50) from the liquid mixture. A funnel (40) is attached to the underside (20) of the roof (30) in the cavity (100) to extend downwardly into the liquid mixture wherein the funnel (140) has formed perforations (500) near the attachment of the funnel (140) to the underside (20) of the roof (30). A float (110) is operatively connected to the funnel (140) and selectively closes over the perforations (500) when the float (110) is in sour water (40) and opens over the perforations when the float (110) is disposed in hydrocarbons (50).

7 Claims, 8 Drawing Figures

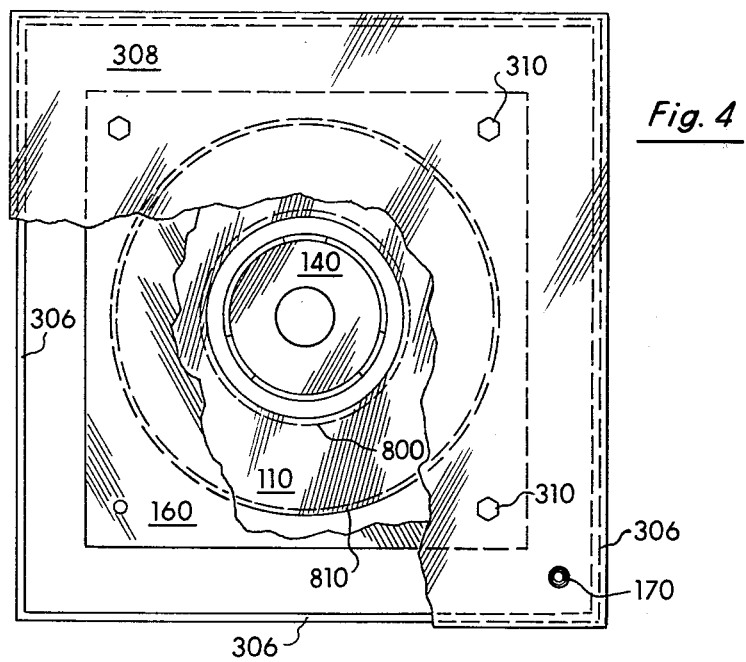
*Fig. 4*
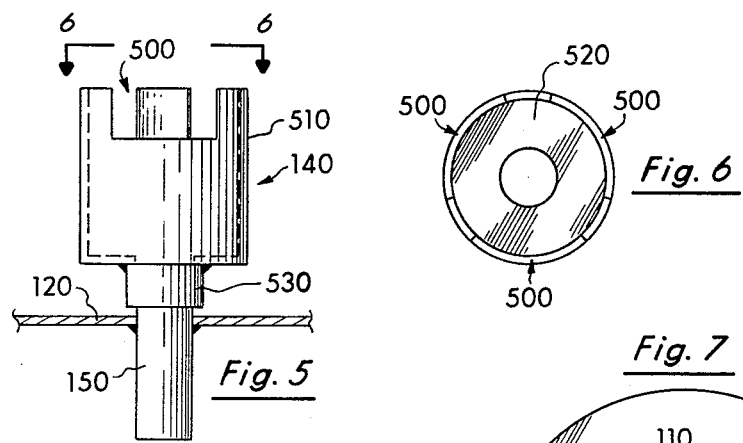
*Fig. 5*
*Fig. 6*
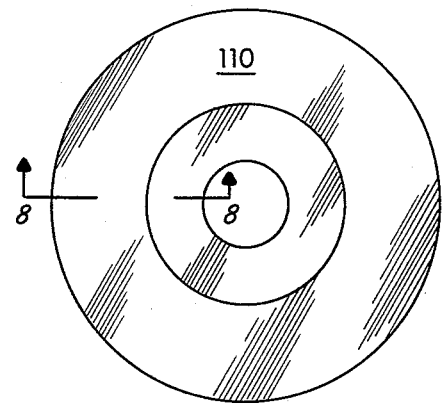
*Fig. 7*
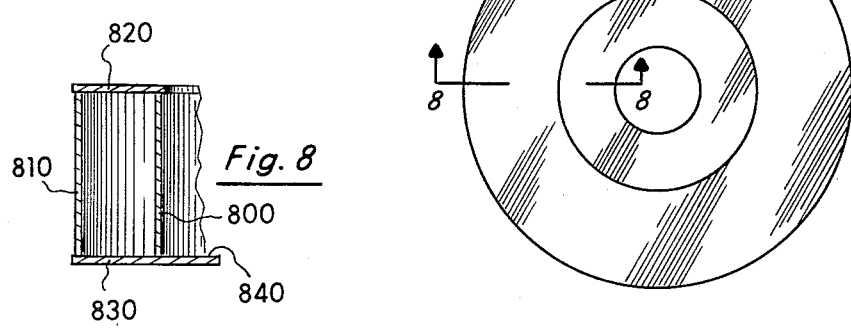
*Fig. 8*

SKIMMER FOR FLOATING ROOF STORAGE TANKS

TECHNICAL FIELD

The present invention relates generally to skimmers for removing a lesser specific gravity liquid in a mixture of two immiscible liquids such as light hydrocarbons from water and, more particularly, to a skimmer adapted to be used in floating roof tanks holding the immiscible liquids intermixed with sour gases such as hydrogen sulfide.

BACKGROUND ART

Floating roof tanks are conventionally used to hold or store liquid mixtures which give off gaseous vapors. The roof of such tanks actually floats on the liquid thereby keeping gases from evaporating out of the liquid mixture. A floating roof tank can have a fixed roof above the floating roof. In the case of a sour water liquid mixture, such as a processing liquid in the petroleum industry, the sour water mixture may contain hydrogen sulfide gas and/or other noxious gases. Such sour water is stored in floating roof tanks in order to keep the toxic hydrogen sulfide vapors intermixed with the water. Such sour water, however, contains light hydrocarbons such as NAPHTHA. It is desirable to separate out the light hydrocarbons not only to retrieve the valuable hydrocarbons but also to permit the sour water to be processed. The light hydrocarbons separate out naturally and the skimmer removes them from the surface of the water.

The present invention, in its preferred embodiment, sets forth a skimmer being capable of attachment to the underside of conventional floating roofs for removing the light hydrocarbons from the tank without interfering with the operation of the floating roof tank. Other applications for using the skimmer of the present invention to separate a lesser specific gravity immiscible liquid from a mixture of two immiscible liquids can be made.

A patentability investigation conducted on the invention resulted in the following U.S. patents:

| U.S. PAT. NO. | INVENTOR | DATE |
| --- | --- | --- |
| 3,535,236 | Travis, H. J. | October 20, 1970 |
| 3,628,660 | Cornelis In't Veld | Dec. 21, 1971 |
| 4,082,669 | Bainbridge | April 4, 1978 |
| 4,111,806 | Wright et al | Sept. 5, 1978 |
| 4,132,645 | Bottomley et al | January 2, 1979 |
| 4,147,629 | Geurtsen | April 3, 1979 |

The 1979 patent issued to Bottomley et al. (U.S. Pat. No. 4,132,645) sets forth a two stage oil separator for skimming hydrocarbons from a hydrocarbon-water mixture. The disclosed separator utilizes three hollow cylindrical floats supported on the mixture. A funnel-shaped skimmer having perforations located around the top of the funnel is disposed in the center of the three floats and can be adjusted vertically. Through proper adjustment, the funnel can be positioned in the mixture so that the lighter hydrocarbons which float on the mixture can be skimmed off into the funnel and downwardly through an interconnecting hose to a point remote from the storage tank.

The 1971 patent issued to Veld (U.S. Pat. No. 3,628,660) sets forth a separator for immiscible liquids such as oil and water and comprises a bell-shaped float. The 1978 patent issued to Wright et al. (U.S. Pat. No. 4,111,806) sets forth a dome or diaphragm which is also designed to float upwardly in the presence of more dense liquid and below in the presence of less dense liquid. The Wright et al patent represents an improvement of the Veld approach. In both approaches, the lighter oil collects within the bell causing the bell to rise to the top of the separation tank. When the bell reaches a given height, the accumulated oil exits the chamber through an outlet port causing the bell to drop back to its initial level. The separation cycle then begins anew as additional oil-water mixture is allowed to enter the system. The 1979 patent issued to Geurtsen (U.S. Pat. No. 4,147,629) sets forth an approach similar to Veld and Wright.

The 1978 patent issued to Bainbridge (U.S. Pat. No. 4,082,669) utilizes three separating stages for separating oil from water. The first stage utilizes a series of plates over which the mixture flows in an upward direction so that oil gathers on the upper surfaces of the plates. In the second stage, a coagulator is utilized through which water and any oil not separated in the first stage flows in an upward direction wherein the coagulator bed comprises finely divided material having a greater affinity for oil than water. Finally, in the third stage, a screen is utilized which is fine enough to remove water and leaving any second stage oil of molecular fineness to be collected.

Finally, the 1970 patent issued to Travis (U.S. Pat. No. 3,535,236) sets forth a floating cover for a liquid holding tank for use in covering gas-liberating digesters which are used to treat sewage solids.

None of the prior art approaches found in the patentability search set forth or even suggest the teachings of the present invention for utilizing a light hydrocarbon skimmer actually incorporated into the roof of a sour water storage tank.

DISCLOSURE OF THE INVENTION

The problem faced in skimming off light hydrocarbons from the surface of sour water in floating roof tanks is one of providing a skimmer that does not interfere with the normal operation of the floating roof and is further capable of moving with the changing position of the floating roof and still function to skim off light hydrocarbons.

The skimmer of the present invention provides a solution to the problem by providing a formed cavity on the underside of the floating roof above the sour water wherein the formed cavity extends above the surface of the floating roof a predetermined distance and is capable of collecting the light liquid hydrocarbons wherein a funnel is designed to be attached to the underside of the floating roof centered in the cavity and extending downwardly in the cavity and into the liquid mixture. The funnel has a plurality of perforations near where the attachment of the funnel to the underside of the floating roof occurs. A float encompasses the funnel and opens the perforations when the float sinks in light hydrocarbons and closes the perforations when the float floats on the sour water. The perforations interconnect with a liquid channel in the funnel and the hose for delivering the light hydrocarbons from the cavity and out from the tank. A vent is provided in the cavity to vent any gases, such as those from the sour water, so that the float operation will not be influenced by the build up of any gases.

As the floating roof changes position, the operation of the skimmer also changes positions and is unaffected thereby being capable of continually sensing the presence of hydrocarbons and for removing the light hydrocarbons from beneath the floating roof.

BRIEF DESCRIPTION OF THE DRAWING

FIG. 4 is a top view of the skimmer of the present invention, in partial cut-away, as shown in FIG. 3;

FIG. 5 is a side view of the funnel of the present invention;

FIG. 6 is a top view of the funnel of the present invention as shown in FIG. 5;

FIG. 7 is a top view of the float of the present invention; and

FIG. 8 is a cross-sectional view of the float taken along line 8—8 of FIG. 7.

BEST MODE FOR CARRYING OUT THE INVENTION

Figure 1:
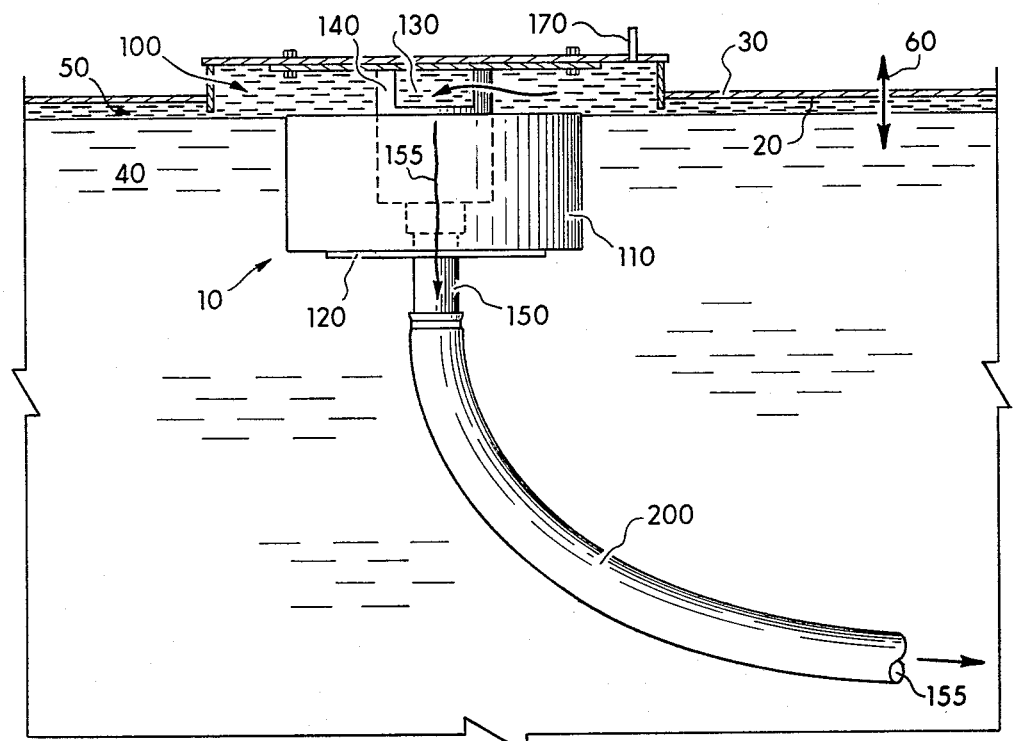
FIG. 1 is an illustration of the skimmer of the present invention operating to remove light hydrocarbons from the cavity formed beneath the floating roof.
Figure 2:
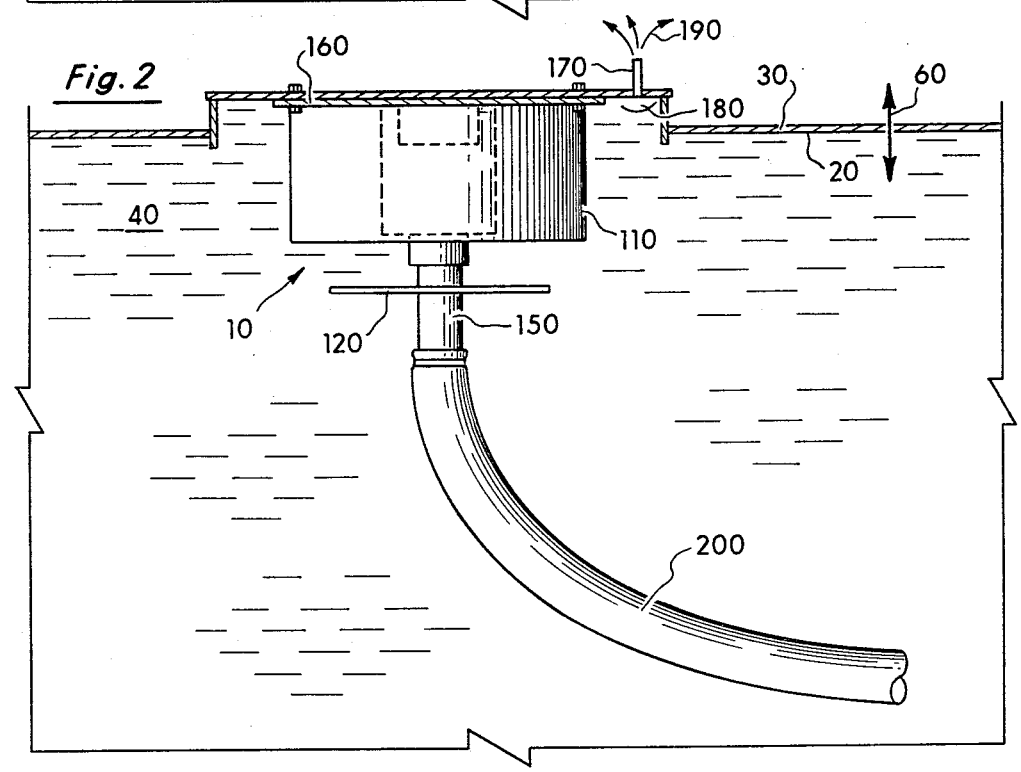
FIG. 2 is an illustration of the skimmer of the present invention operating to prevent the passage of sour water once the light hydrocarbons are removed.

In FIGS. 1 and 2, the operation of the skimmer (10) of the present invention is set forth.

In the preferred embodiment, the hydrocarbon skimmer (10) of the present invention is adapted to be mounted on the underside (20) of the floating roof (30). The floating roof (30) floats on the surface of a liquid mixture containing sour water (40) and light hydrocarbons (50). Hence, the floating roof (30) can conventionally move upwardly or downwardly with the level of the liquid mixture as indicated by arrow 60. The hydrocarbon skimmer (10) of the present invention is centered in a raised formed cavity (100) and operates in the following fashion.

In FIG. 1, the float (110) is in the fully opened position abutting a downward stop (120). In the open position, a layer of light hydrocarbons (50) has collected in the cavity (100) and located beneath the underside (20) of the floating roof (30). The float (110) is designed to have a specific gravity greater than the specific gravity of the light hydrocarbons (50) and, therefore, is held in the open position by the force of gravity against the bottom stop (120). At this time, the light hydrocarbons (50) flow or can be pumped into perforations (130) of funnel (140) and into outlet hose (200). Hence, when the float (110) is in the open position, a liquid passageway (155) is established for delivering and collected hydrocarbons out from the cavity (100) and out from the floating roof storage tank.

When the hydrocarbons (50), as shown in FIG. 1, are delivered out from the cavity (100), the float (110) commences to travel upwardly and to close against an upward stop or plate (160). In this, the closed position, the float (110) is held against the upper stop (160), in a substantially sealed engagement, because the specific gravity of the float (110) is designed to be less than the specific gravity of the sour water (40) and, therefore, it is buoyed upwardly against stop plate (160). In the closed position, no sour water (40) is delivered through the hose (200) in passageway of channel (155).

Because hydrocarbons (50) and water (40) are immiscible liquids and because light hydrocarbons have a lesser specific gravity than the specific gravity of sour water, the light hydrocarbons will continue to separate from the liquid mixture and, after a period of time, a new layer of hydrocarbons (50) will form as shown in FIG. 1 and the cycle will repeat itself. The cycle also repeats itself when additional sour water is added to the tank.

As further shown in FIGS. 1 and 2, a small vent (170) is provided to exhaust any trapped air (180) from the cavity (100) to an area upwardly and above roof (30) as shown by arrows (190) but under the upper roof of the tank, not shown. The vent is necessary to vent trapped air (180) when the tank is first filled up. The gases are kept in solution by the floating roof.

Figure 3:
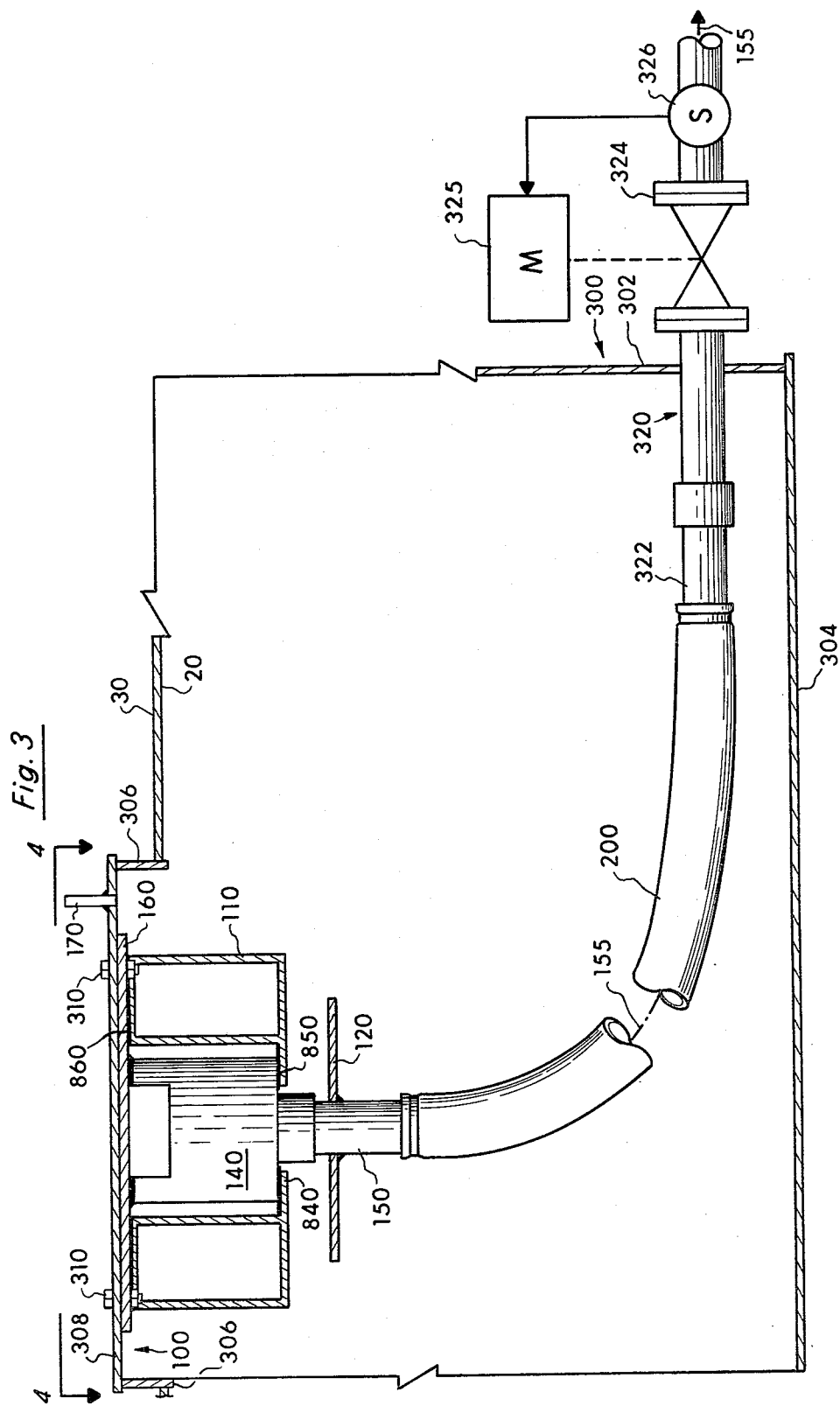
FIG. 3 sets forth a side view of the skimmer of the present invention, in partial cross-section, mounted to a floating roof.

In FIGS. 3 through 8, the details of the skimmer (10) of the present invention are set forth. In FIG. 3, the upper stop or plate (160) is held in the center of the cavity (100) on the underside (20) of the floating roof (30) by means of nuts and bolts (310). In the preferred embodiment, the head of the bolt (310) is welded because otherwise sour water would leak through and sink the roof (30) so that the upper plate (160) can be easily removed therefrom. In FIG. 3, the float (110) is held up against the upper stop plate (160) around the funnel (140). The details of the funnel (140) are shown in FIGS. 5 and 6 to include a number of formed slots (500) disposed around the periphery of the cylinder (510) which terminates in a bottom portion (520) interconnected with a second cylinder portion (530). The funnel, itself, is primarily composed of cylinder (510) with the perforations (500) formed near the attachment of the funnel (140) to the bottom surface (20) of the floating roof (30). In the preferred embodiment, the funnel (140) is welded to plate (160).

Affixed near the bottom of the funnel (140) is a circular bottom or lower stop plate (120) and a standard hose connection (150).

The details of the float (110) are shown in FIGS. 7 and 8. The float (110) is of hollow construction being formed from thin steel and designed to have a specific gravity greater than that of the light hydrocarbons (50) and lower than that of the sour water (40). As shown in FIG. 7, the float (110) is formed from a cylinder in the form of two cylinders which form a concentric ring around the funnel (140) and is capable of traveling up and down the funnel (140) between the lower stop (120) and the upper stop or plate (160). As shown in FIG. 8, the float is formed from two circular sidewalls (800 and 810) and upper and lower sidewalls (820 and 830). Lower wall (830) has an inwardly extending flange (840).

As shown in FIG. 3, the upper wall (820) of float (110), when the float (110) is in the fully closed position, abuts a circular TEFLON seal and the lower flange (840) also abuts against a second TEFLON seal 850 which is against the lower portion of cylinder (510) of funnel (140). In the closed position, the seals (850, 860) serve to substantially prevent the entry of any sour water (40) into the perforations (500) of the funnel (140). However, in the presence of hydrocarbons (50), the float drops as shown in FIG. 1.

The nuts from the bolts (310) can be easily removed and the entire skimmer (10) of the present invention can be disconnected from the floating roof (30). It is to be expressly understood that dimensions of the float, the funnel, the raised roof section, and other dimensions can be varied to meet the specific design parameters of different immiscible liquids.

In FIG. 3, the remaining system components for the operation of the skimmer (10) of the present invention are set forth. The hose 200 is connected through coupler (322) to pipe (320). A pump (324) is activated by motor (325) connected onto pipe (320) and is controlled by the low flow sensor (326), as will be discussed next. The fluid channel or passageway (155) is maintained from the skimmer (10), through hose (200) out from the tank.

When light hydrocarbons are present in the skimmer (10) of the present invention, the pump (324) activated by motor (325) operates to pump the hydrocarbons through passageway (155). The motor (325) is manually activated. As the hydrocarbons (50) are removed from the tank, the float (110) will move upwardly and will start to choke the flow of hydrocarbons (50) and thereby starve the pump (324) causing it to lose suction. At this time, the pump (324) rather than pumping a continuous flow of hydrocarbons (50) discharges slugs of hydrocarbons. A low flow shutdown switch (326) senses this low fluid flow condition and turns the motor (325) off and pumping stops. In the preferred embodiment, the switch (326) is an electric pneumatic flow indicator Model No. NF (265) manufactured by Liquid Level Electronics Inc., P.O. Drawer 788, Porter, Tex. 77365.

Furthermore, it is to be expressly understood that while a cylindrically shaped funnel (140) has been shown in the preferred embodiment, the funnel could also be of a frustro-conical design or any other suitable design capable of delivering skimmed hydrocarbons from beneath the floating roof (30). And, while an annular cylindrically shaped float has been disclosed, other types of floats could also be suitably used without departing from the teachings of the present invention. Therefore, while the skimmer of the present invention has been specifically set forth in the above disclosure, it is to be expressly understood that modifications and variations to the design can be made which would still fall within the scope and coverage of the appended claims herewith.

I claim:

1. A hydrocarbon skimmer (10) for a floating roof tank (300), said floating roof tank (300) holding a liquid mixture of sour water (40) and hydrocarbons (50) with the aforesaid roof (30) floating on said mixture, said hydrocarbon skimmer comprising:
   a formed cavity (100) on the underside (20) of said floating roof (30) above said liquid mixture (40, 50), said formed cavity (100) extending above the surface of said floating roof (30) and being capable of collecting said hydrocarbons (50) from said liquid mixture,
   a funnel (140) attached to said underside (20) of said roof (30), said funnel (140) extending downwardly in said cavity (100) and into said liquid mixture (40, 50), said funnel (140) having formed perforations (130) near said attachment to said underside (20),
   a float (110) operatively connected to said funnel (140) closing over said perforations (130) in a closed position when said float (110) is in said sour water (40) and opening said perforations (130) in an open position when said float (110) is in said hydrocarbons (50), and
   means (155) engaging said funnel (140) for delivering said hydrocarbons (50) from said formed cavity (100) when float (110) is in said open position.

2. The hydrocarbon skimmer of claim 1 further comprising:
   means (850, 860) on said funnel (140) for substantially sealing said float (110) against said funnel (140) when said float (110) is in said closed position, said sealing means (850, 860) being capable of substantially preventing the entry of said sour water (40) into said delivering means (155).

3. The hydrocarbon skimmer of claim 1 wherein said funnel (140) is cylindrical in shape and wherein said float (110) is cylindrical in shape and forms a concentric ring around said funnel (140), said float (110) being capable of traveling a predetermined distance along the funnel (140) between said open and closed positions.

4. The hydrocarbon skimmer of claim 1 further comprising a formed vent (170) through said floating roof (30), said formed vent (170) being located in the portion of said floating roof (130) containing said formed cavity (100), said formed vent (170) being capable of venting any gas (180) trapped in said cavity (100).

5. The hydrocarbon skimmer of claim 1 further comprising:
   a pump (324) connected to said passageway (155) for pumping said hydrocarbons (50),
   a motor (325) operatively connected to said pump (324) for activating said pump (324), and
   a low flow switch (326) responsive to a low flow condition of said hydrocarbons (50) in said passageway (155) for turning said motor (325) off.

6. A hydrocarbon skimmer (10) for a floating roof tank (300), said tank (300) holding a liquid mixture of sour water (40) and light hydrocarbons (50) with the aforesaid roof (30) floating on said mixture, said light hydrocarbons (50) having a specific gravity lower than said sour water (40), said hydrocarbon skimmer comprising:
   a formed cavity (100) on the underside (20) of said floating roof (30) above said liquid mixture (40, 50), said formed cavity (100) extending above the surface of said floating roof (30) and being capable of collecting said light hydrocarbons (50) from said liquid mixture (40, 50),
   a substantially cylindrically shaped funnel (140) centered in said formed cavity (100) and attached to said underside (20) of said floating roof (30), said funnel (140) extending downwardly into said liquid mixture (40, 50) and terminating in:
   (a) a stop plate (120) and
   (b) a hose connection (150),
   said funnel (140) having a plurality of formed perforations (130) disposed around the end of the funnel (140) near said attachment of said funnel (140) to said underside (20), said perforations (130) being part of a liquid channel (155) established through said perforations (130), the interior of said funnel (140), and the interior of said hose connection (150),
   a float (110) forming a concentric ring around said funnel (140) and being capable of traveling up said funnel (140) to close over said perforations (130) in a closed position when said sour water (40) is in said cavity area (100) under said floating roof (30) and being capable of traveling down said funnel to said stop plate (120) to open said perforations in an open position when said light hydrocarbons are in said cavity area (100) to permit said light hydrocarbons (50) to enter said liquid channel (155), the specific gravity of said float (110) being less than the specific gravity of said sour water (40) and greater than the specific gravity of said light hydrocarbons (50),
- a hose (200) engaging said hose connection (150) for delivering said light hydrocarbons (50) in said liquid channel (155) out from said tank (300),
- a pump (324) on the outside of said tank (300) and connected to said fluid channel (155) for pumping said hydrocarbons (50) out from said tank (300),
- a motor (325) operatively connected to said pump (324) for activating said pump (324),
- a low flow switch (326) responsive to a low flow condition of said hydrocarbons (50) in said fluid channel (155) for turning said motor (325) off,
- a vent (170) in said floating roof (30) for removing any air (180) contained within said cavity (100), to prevent the interference by said air (180) with the operation of said float (110), and
- means (850, 860) between said float (110) and said funnel (140) for substantially sealing said float (110) against said funnel (140) to substantially prevent the entry of said sour water (40) into said liquid channel when said float (110) is in said closed position.

7. A skimmer (10) for removing the lesser specific gravity liquid (50) in a mixture of two immiscible liquids (40, 50) and sour gases, each of said immiscible liquids (40, 50) having different specific gravities, said sour liquid mixture being stored in a floating roof storage tank (300) with the aforesaid roof (30) floating on said mixture to prevent the evaporation of said gases from said liquid and gas mixture, said skimmer (10) comprising:
- a formed cavity (100) on the underside of said floating roof (30) above said liquid mixture (40, 50), said formed cavity (100) extending above the surface of said floating roof (30) and being capable of collecting said lesser specific gravity liquid (50) in said liquid mixture (40, 50),
- means (140) attached to said underside of said roof (30) for removing said collected lesser specific gravity liquid (50) from said cavity (100),
- a float (100) operatively connected to said removing means (140) for closing said removing means (140) when said float (110) is disposed in said greater specific gravity liquid (40) and for opening said removing means when said float (110) is disposed in said lesser specified gravity liquid (50), and
- means in said floating roof (30) for removing any air (180) trapped in said cavity (100) to prevent the interference by said air (180) with the operation of said float (110).

* * * * *

UNITED STATES PATENT AND TRADEMARK OFFICE
CERTIFICATE OF CORRECTION

PATENT NO.   : 4,431,536
DATED        : February 14, 1984
INVENTOR(S)  : Timothy J. Thompson It is certified that error appears in the above-identified patent and that said Letters Patent are hereby corrected as shown below:

Abstract, line 11: After funnel delete "(40)" and insert --(140).
Col. 1, line 53:   After et al delete ".".
Col. 2, line 26:   Delete "and" and insert --while--.
Col. 6, line 21:   Delete "(130)" and insert --(30)--.

Signed and Sealed this

Second Day of July 1985

[SEAL]

Attest:

DONALD J. QUIGG

*Attesting Officer*     *Acting Commissioner of Patents and Trademarks*